United States Patent [19]
Titzer

[11] Patent Number: 6,135,363
[45] Date of Patent: Oct. 24, 2000

[54] VEHICLE WASH BOOM SYSTEM

[76] Inventor: Charles D. Titzer, 5977 Sharon Rd., Newburgh, Tenn. 47630

[21] Appl. No.: 09/321,104

[22] Filed: May 27, 1999

[51] Int. Cl.[7] ..................................................... B05B 15/06
[52] U.S. Cl. .......................... 239/209; 239/750; 239/752; 15/DIG. 2; 134/123; 248/58
[58] Field of Search .................................... 239/209, 195, 239/750, 751, 752; 134/172, 198, 123; 15/DIG. 2, 97.3, 53.1; 248/49, 58, 59, 75, 283.1, 333

[56] References Cited

U.S. PATENT DOCUMENTS

| | | | |
|---|---|---|---|
| 3,265,087 | 8/1966 | Livingston | 239/750 |
| 3,517,694 | 6/1970 | Liefring | 239/209 |
| 3,648,316 | 3/1972 | Habian et al. | |
| 4,456,177 | 6/1984 | Johnson. | |
| 5,110,049 | 5/1992 | Harris et al. | |
| 5,620,157 | 4/1997 | Titzer. | |

*Primary Examiner*—Andres Kashnikow
*Assistant Examiner*—Lisa Ann Douglas
*Attorney, Agent, or Firm*—Diller, Ramik & Wight, PC

[57] ABSTRACT

A vehicle wash boom apparatus includes a fixed journalling tube for journalling a boom-supporting tube for reciprocal and rotational movement about a vertical axis. The journalling tube carries a cam and the boom-supporting tube carries a cam follower. A pair of torsion springs at all times bias the cam follower in an upward direction against a cam surface of the cam which is inclined relative to the vertical axis. Thus, as the boom is rotated, the interaction between the cam and the cam follower effects a vertical movement of the boom-supporting member which allows the boom while being used to by-pass a like boom of an identical apparatus when in its home or parked position.

55 Claims, 4 Drawing Sheets

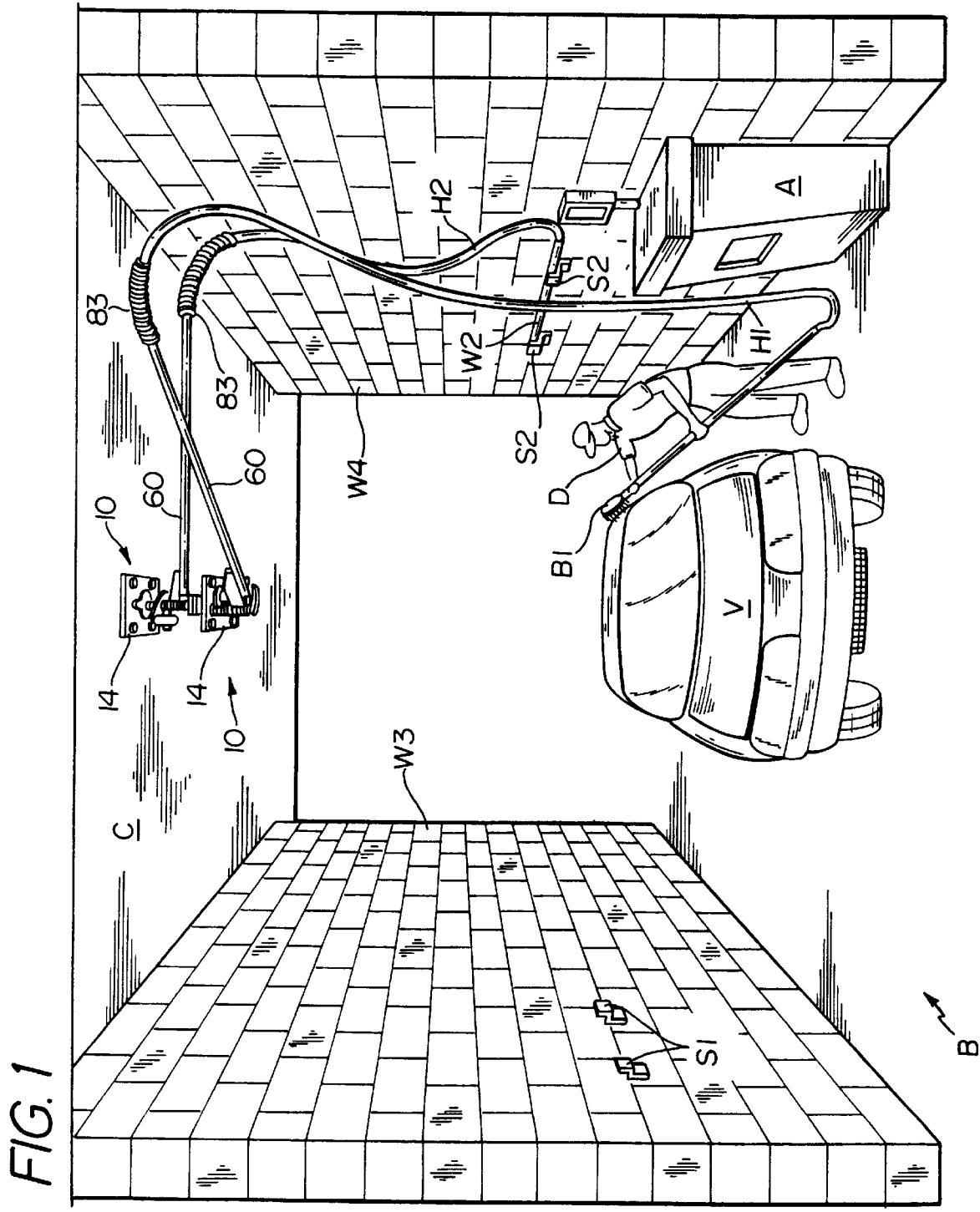

VEHICLE WASH BOOM SYSTEM

BACKGROUND OF THE INVENTION

This invention is directed to a novel vehicle wash boom system associated with self-service vehicle wash bays into which automobiles, trucks or the like can be driven, parked and washed utilizing coin-operated low pressure washing brushes and high pressure pre-washing and rinsing wands.

In U.S. Pat. No. 5,620,157 issued on Apr. 15, 1997 to Charles D. Titzer, a car wash boom system is disclosed which includes two booms with one of the booms including a cam and cam follower and a torsion spring to rotate the boom between a parked or home position at which the other boom can pass therebeneath and an in-use position. The latter boom system has proven quite successful, but limitations involve the cost of manufacture, including the costs of parts and/or the fabrication and assembly thereof. The present invention avoids the latter by providing a vehicle wash boom system in which the components thereof are exceedingly inexpensive to manufacture and assemble, not to mention simplicity in servicing and repair.

Other patents involving rotatable boom systems are found in patents cited in U.S. Pat. No. 5,620,157, namely, U.S. Pat. No. 5,110,049 granted on May 5, 1992; U.S. Pat. No. 4,456,177 granted on Jun. 26, 1984 and U.S. Pat. No. 3,648,316 granted on Mar. 14, 1972.

SUMMARY OF THE INVENTION

In keeping with the foregoing, a primary object of the present invention is to provide a novel apparatus for effecting side-by-side rotation of two booms of substantially identical construction with each boom being disposed in a substantially horizontal plane and rotating about a vertical axis. Each boom is provided with cam means and cam follower means for effecting controlled vertical movement of the associated boom between a park, home or non-use position and an in-use position, the latter positions occupying substantially horizontal planes spaced vertically from each other. Preferably, a pair of tension springs normally biased each boom toward its home position. With one boom in its home position, rotation of the other boom effects automatic bypass of the booms relative to each other.

In further accordance with this invention, a journal in the form of a station journalling tube is bolted to an upper support, such as a ceiling, roof or girders in a car wash bay, and a support tube or support member is telescopically housed therein for vertical reciprocal and rotational movement. A lower end of the support tube carries the boom and lower ends of a pair of tension springs are connected thereto. Upper ends of the tension springs are connected to a freely rotatable collar which seats upon a collar fixed to the stationary journalling tube. An annular plate is welded to an exterior of the journalling tube at an angle thereto to define a cam and a cam follower carried by the boom support tube rides against a lower cam surface of the cam to effect controlled reciprocal motion of the boom between its home/non-use and use positions.

In further accordance with the present invention, the vertical reciprocating and rotating boom support tube includes means for delivering fluid, such as water, to an upper end portion thereof, and means at a lower end portion for delivering the water via a tube through the boom to an application area.

With the above and other objects in view that will hereinafter appear, the nature of the invention will be more clearly understood by reference to the following detailed description, the appended claims and the several views illustrated in the accompanying drawings.

BRIEF DESCRIPTION OF THE DRAWINGS

FIG. 1 is a perspective view of a vehicle wash bay, and illustrates the apparatus of the present invention in the form of two duplicate structures, each including a fixed journalling tube in which is telescopically reciprocal and rotatable a boom support tube carrying a boom at its lower end which is biased upwardly by springs and controlled between home and in-use positions of the boom by a fixed cam carrying by the journalling tube and a cam follower carried by the boom support tube.

DESCRIPTION OF THE PREFERRED EMBODIMENTS

Figure 3:
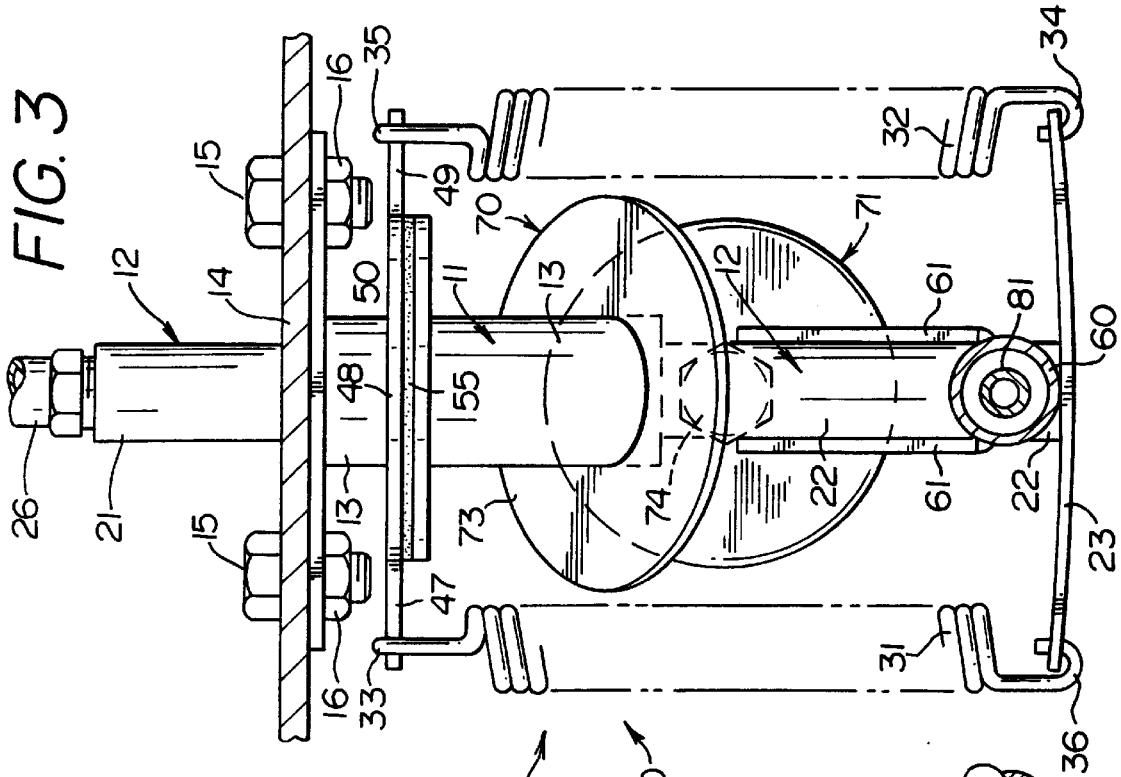
FIG. 3 is a elevational view of the boom assembly of FIG. 2, and illustrates details thereof including an annular anti-friction disc located between the two collars.

A novel apparatus for effecting side-by-side rotation of a pair of elements, such as booms, about substantially parallel axes of rotation absent interference therebetween is best illustrated in FIG. 1 of the drawings in association with a vehicle car wash bay B.

Two such identical apparatuses are illustrated in FIG. 1 secured to a ceiling C, and each includes respective hoses H1, H2 carrying a brush B1 and a wand W2. When in use, a driver D places coins, tokens and/or currency in a conventional acceptor A having push-buttons and/or a dial for selecting a particular operation which is to be preformed upon an associated vehicle V, such as a car. More often than not, rinse water delivered through the high pressure wand W2 is used to pre-soak the vehicle V after which the brush B1 is used to wash the vehicle V followed by the subsequent rinsing thereof, again utilizing the wand W2. During the latter activities, the person or driver D walks in various directions about and around the vehicle V, and depending upon the particular operation being performed by either the brush B1 or the wand W2, one will be housed at a stationary, home or park location, while the other is being manipulated. In FIG. 1, the wand W2 and its boom are shown in their stationary position, while the brush B1 is being utilized. The opposite is apparent, and for convenience walls W3, W4 of the bay B have respective supports S1, S2 for the brush B1 and for the wand W2, respectively. As is apparent from the latter described patent to Titzer and from FIG. 1, during the relative movement of the driver D, when washing or rinsing the car utilizing the either the brush B1 or the wand W2, respective booms 60 of the apparatuses 10 must readily and freely pass each other absent interference, and the identical apparatuses 10 are constructed to achieve the latter purpose.

Reference is now made to FIGS. 2 through 5 of the drawings which illustrate the apparatus 10 which includes means 11 for journalling a support member or tube 12 for rotation in opposite directions about a substantially vertical axis Va (FIGS. 4 and 5) and for sliding reciprocal movement vertically substantially along the vertical axis Va.

The journalling means 11 includes a journalling tube 13 carrying at its upper end (unnumbered) a polygonal flange 14 having a plurality of holes (not shown) through which pass bolts 15 and to which are secured nuts 16. The bolts 15 pass through openings (not shown) in a beam (unnumbered) in the ceiling C of the bay B or any of the substructure associated therewith. The ceiling C includes an opening O through which projects an upper end portion 21 of the support member or tube or boom supporting member or tube 12 which is another tube telescopically and rotatably assembled within the stationary journalling tube 13 and having a lower end portion 22 closed by an end plate 23. A short tubular stem 24 (FIG. 4) projects radially outwardly from the support tube or boom-supporting tube 12 and is adapted to discharge fluid, such as water, therefrom. The fluid or water is introduced into the upper end portion 21 of the boom-supporting tube 12 through a conventional fitting 25 threaded into an interior thread (unnumbered) of the tube 12 and being connected by a hose 26 to a source of water. The upper end portion 21 of the boom-supporting tube 12 projects through the opening O in the ceiling C to provide access for connecting the hose 26 thereto.

Figure 2:
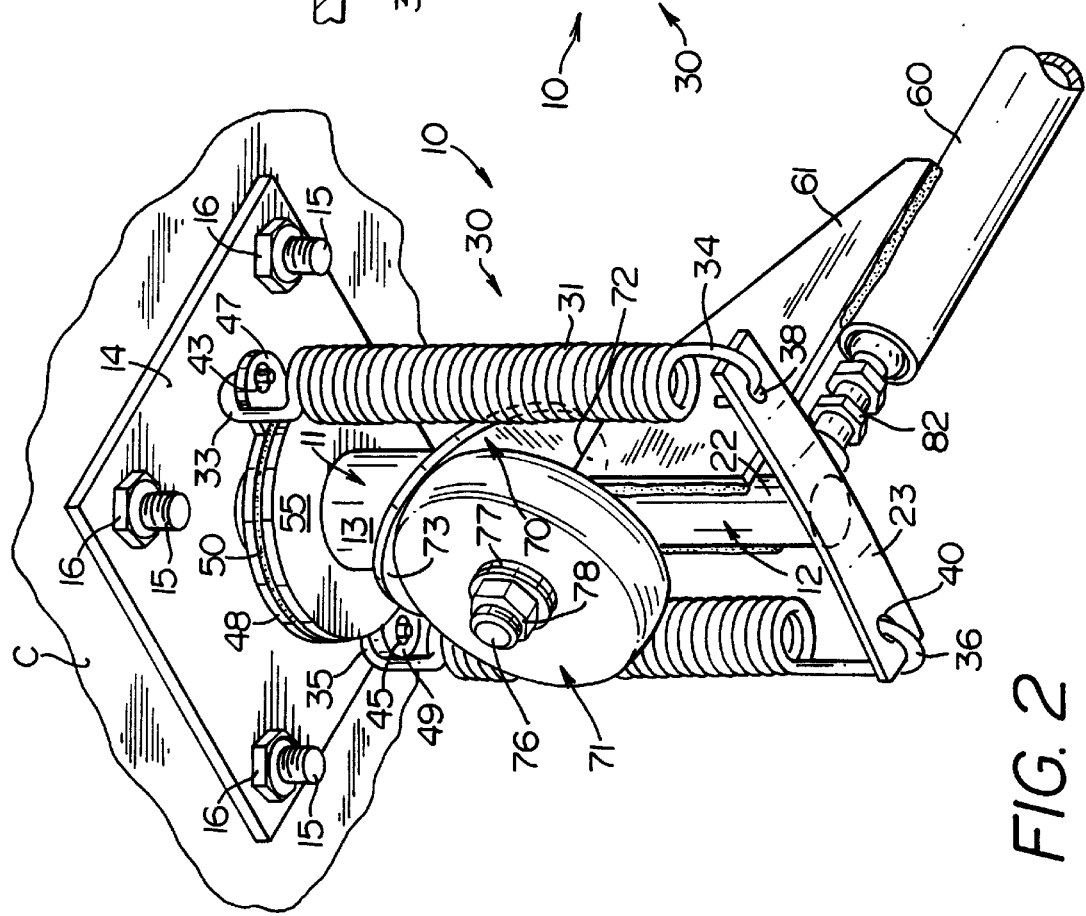
FIG. 2 is a fragmentary perspective view of one of the two identical apparatuses illustrated in FIG. 1, and illustrates the details of the boom, the boom support tube, the cam and cam follower, the pair of tension springs, and the connections of the tension springs to a lower end portion of the boom support tube, and to a collar rotatable relative to the journalling tube which rotates upon a collar fixed to the journalling tube.

The boom-supporting tube 12 is normally biased toward its home or uppermost position by biasing means 30 (FIGS. 2 and 3) in the form of identical tension springs 31, 32 each having respective upper and lower hooks 33, 34 and 35, 36. The lower hooks 34, 36 are received in openings 38, 40, respectively, of the end plate 23 (FIG. 2). The upper hooks 33, 35 of the respective spring 31, 32 are received in respective openings 43, 45 of diametrically projecting flanges 47, 49 of a collar 48. The collar 48 is of an annular construction and is mounted in free rotation about the journalling tube 11, as is readily apparent in FIGS. 2 through 4 of the drawings. The collar 48 includes an opening 46 (FIG. 4) into which projects an upwardly directed cylindrical flange 51 of a substantially annular anti-friction collar 50 which in turn seats upon a stationary support collar 55 of an annular construction surrounding and welded to the exterior of the journalling tube 11.

Figure 4:
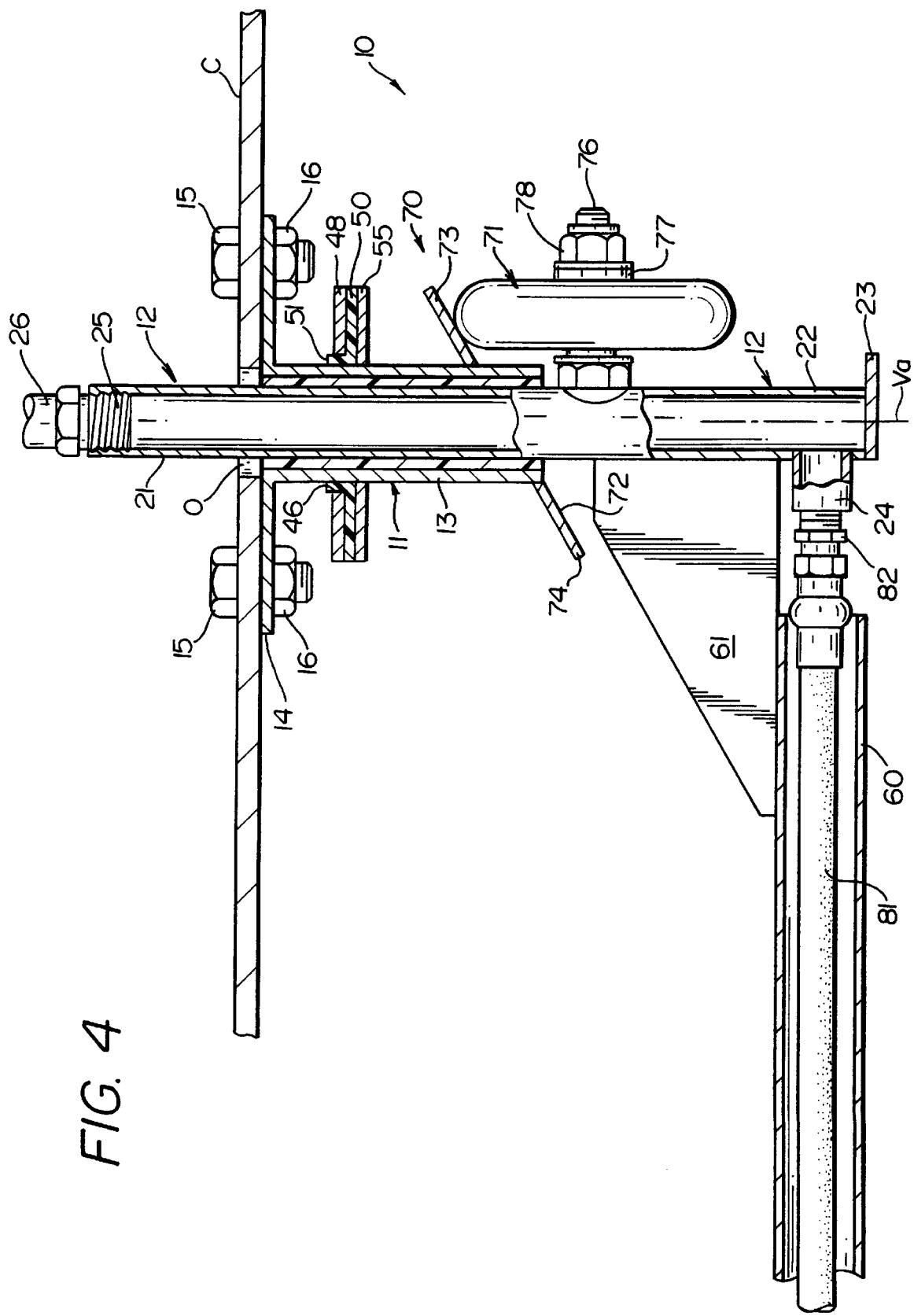
FIG. 4 is a vertical cross-sectional view through the apparatus, and illustrates cross-sectional details thereof, including the boom in its home or non-use position.

A tubular boom 60 is welded to a pair of boom supporting plates 61 which are in turn welded to the lower end portion 22 of the support tube 12 above the tubular stem 24, as is best illustrated in FIGS. 3 and 4 of the drawings.

As is readily apparent from the drawings, as the boom 60 rotates about the vertical axis Va in either direction, the boom support plates 61 and the support tube 12 rotate therewith, as to the tension springs 31, 32 (See FIG. 2) because of the connection of the hooks 36, 38 to the end plate 23. Rotation of the end plate 23 is transmitted through the tension springs 31, 32 to the collar 48 which effects rotation of the collar 48 about the vertical axis Va. In this matter the boom 60 can rotate about the vertical axis Va 360° (or more) in opposite directions during which rotation the collar 48, the springs 31, 32, the end plate 23, the support tube 12 and the boom supporting plates 61 rotate therewith.

Figure 5:
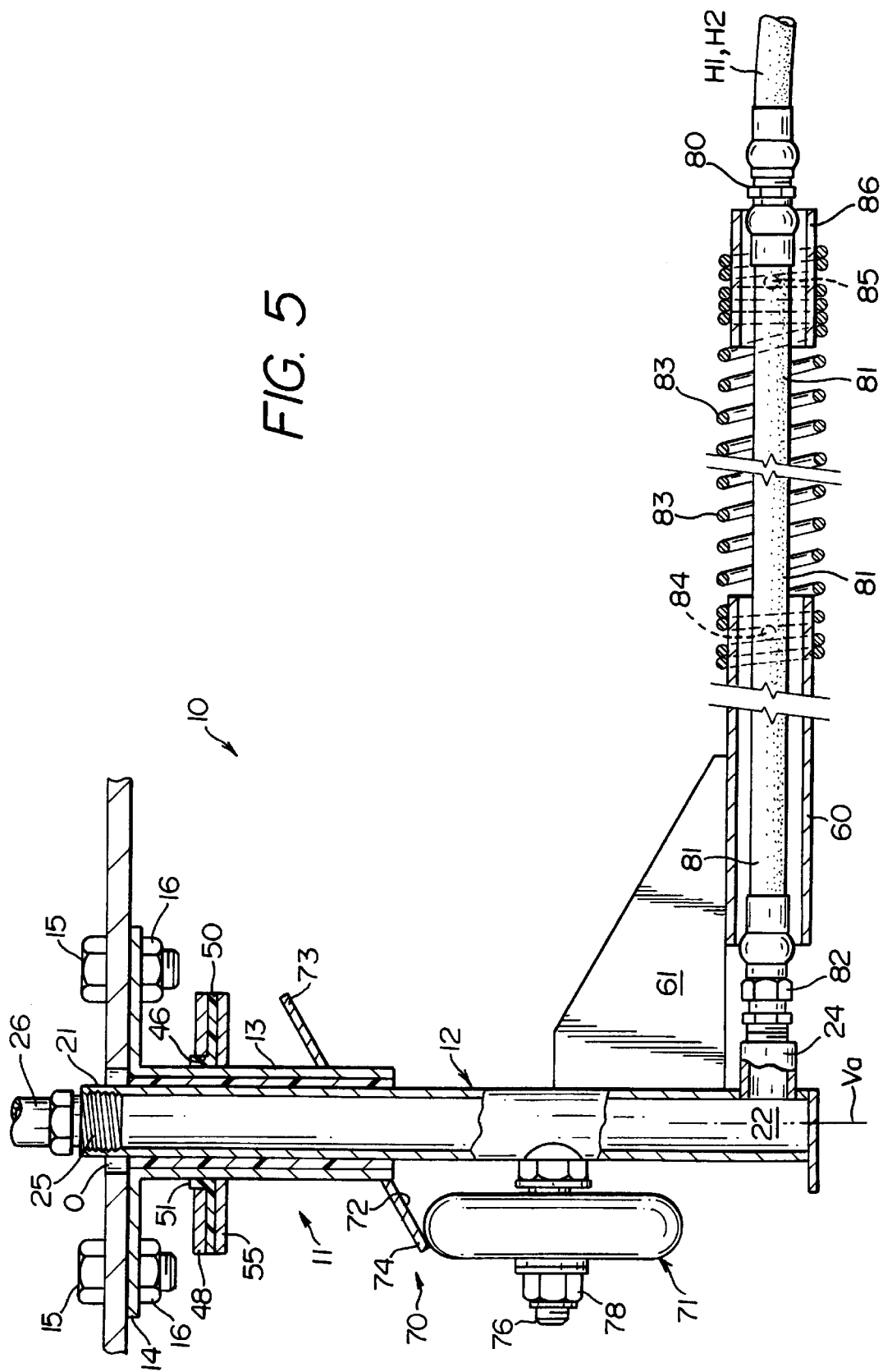
FIG. 5 is a cross-sectional view through the apparatus, and illustrates the boom in its lower in-use position.

Cam means 70 and cam follower means 71 are carried respectively by the journalling tube 11 and the boom support tube 12, as is best illustrated in FIGS. 2 through 5 of the drawings. The cam 70 is an annular cam plate having an inner edge (unnumbered) welded at an angle to the vertical axis Va so as to define a lower cam surface 72 along which follows the cam follower means 71 in the form of a cam follower roller. The cam surface 72, due to the angular orientation of the cam 70 relative to the vertical axis Va, has a high side 73 and a low side 74 disposed diametrically opposite each other. The cam follower roller 71 is journalled for rotation upon a partially threaded stem 76 welded to an exterior of the support tube 12. The cam follower roller 71 is freely rotatable upon a conventional bearing 77 conventionally secured to the stem 76 by a nut 78. As is most evident from FIGS. 2 and 3 of the drawings, the springs 31, 32 continuously lift the boom support tube 12 upwardly in a vertical direction thereby at all times bringing and holding the cam follower roller 71 against the cam surface 72 of the cam means or cam plate 70. In FIGS. 2 through 4 of the drawings, the tubular boom 60 is illustrated in its uppermost home or park position at which the cam follower roller 71 seats against the high end 73 of the cam surface 72 and is held thereat by the tension springs 31, 32. However, as the tubular boom 60 is rotated, about the axis Va in either direction, the cam follower roller 71 progressively descends from the high end 73 of the cam surface 72 toward the low end 74 thereof at which time the boom-supporting tube 12 not only rotates but descends downwardly against the ever lengthening of the springs 31, 32 until, of course, the bottom end 74 of the cam 72 is reached by the cam follower roller 71. (The latter position is illustrated in FIG. 5 of the drawings, and by comparing FIGS. 4 and 5, it will be readily apparent that the boom 60 of FIG. 5 can pass freely beneath the boom 60 of FIG. 4 so long as the cam means 70 thereof are oriented 180° displaced from each other, as are the mounting positions of the apparatuses 10, 10 of FIG. 1. In other words, the apparatuses 10, 10 of FIG. 1 are mounted to the ceiling C such that the booms 60 thereof are in their home or park position when the booms 60 are projecting in diametrically opposite directions, the latter is readily achieved by mounting one of the apparatuses 10 with its boom 60 in the park position pointing toward the one wall W3 (FIG. 1) of the bay B while the boom 60 of the other apparatus 10 would in its park position point toward the opposite wall W4 of the bay B. When thus oriented, the high ends 73, 73 of the cam plates 70 are immediately adjacent each other and the low ends 74, 74 of the cam plates 70 are remade from each other. In this fashion, so long as one boom 60 is in its home or park position, the other boom 60 can freely pass therebeneath.

In order to deliver water to the brush B1 and the wand W2, each of the respective hoses H1, H2 are preferably connected to a conventional fitting 80 (FIG. 5) which in turn connects to a flexible tube 81 which is partially in telescopic relationship to the boom 60 and is connected by a conventional fitting 82 to the short stem 24 of the boom-supporting tube 12. A flexible coil spring 83 surrounds a portion (unnumbered) of the flexible tube 81 projecting outwardly of the associated boom 60. The spring 83 is fixed to an end of the boom 60 by a diametrically extending pin 84 and a similar diametrically extending pin 85 connects the spring 83 to a short tube 86. As either of the hoses H1, H2 are manipulated, the spring 83 automatically flexes to prevent the hoses H1, H2 from kinking, cracking and eventually breaking, while water is freely delivered through the tube 81 and the hoses H1, H2 to the respective brush B1 and the wand W2.

Although a preferred embodiment of the invention has been specifically illustrated and described herein, it is to be understood that minor variations may be made in the apparatus without departing from the spirit and scope of the invention, as defined the appended claims. boom 60. The spring 83 is fixed to an end of the boom 60 by a diametrically extending pin 84 and a similar diametrically extending pin 85 connects the spring 83 to a short tube 86. As either of the hoses H1, H2 are manipulated, the spring 83 automatically flexes to prevent the hoses H1, H2 from kinking, cracking and eventually breaking, while water is freely delivered through the tube 81 and the hoses H1, H2 to the respective brush B1 and the wand W2.

When the brush B1 and the wand W2 are in use, the springs 31, 32 thereof are extended and the force applied thereby tending to return the booms 60, 60 to their home position progressively increases between the high cam end 73 and the low cam end 74. However, the force of the tension springs 31, 32 is sufficient to at all times return the booms 60, 60 to their home position without manipulation by the user or driver D. The user or driver D merely releases or ceases pulling the boom 60 by means of the brush B1, the wand W2 and respective hoses H1, H2, and upon such release, the torsion springs 31, 32 automatically return the booms 60 to the home position thereof.

Although a preferred embodiment of the invention has been specifically illustrated and described herein, it is to be understood that minor variations may be made in the apparatus without departing from the spirit and scope of the invention, as defined the appended claims.

What is claimed is:

1. Apparatus for moving an element automatically between first and second positions comprising a substantially vertically oriented support member, means for journalling said support member for rotation in opposite directions about a substantially vertical axis and for sliding movement in opposite directions substantially along said vertical axis, said support member having opposite upper and lower end portions, said lower end portion being reciprocally movable with said support member along said vertical axis between a first uppermost position and a second lowermost position, means for biasing said support member in a first direction to urge said support member lower end portion toward one of said first and second positions, means for controlling the biased movement of said support member toward said one position and toward another position remote therefrom, said controlling means including cooperative cam means and cam follower means carried one by said support member and another in stationary relationship thereto for cooperatively controlling the movement of said support member lower end portion between said one and another positions, and an element carried by said support member lower end portion and movable therewith vertically between said first and second positions and rotationally relatively to said vertical axis upon vertical and rotational movement of said support member.

2. The apparatus as defined in claim 1 wherein said cam means is located in at least partially surrounding relationship to said support member.

3. The apparatus as defined in claim 1 wherein said one position and said first uppermost position are the same.

4. The apparatus as defined in claim 1 wherein said first direction is an upward direction.

5. The apparatus as defined in claim 1 wherein one of said cam means and said cam follower means is carried by said support member.

6. The apparatus as defined in claim 1 wherein said cam follower means is carried by said support member.

7. The apparatus as defined in claim 1 wherein said element is disposed in substantially transverse relationship to said vertical axis.

8. The apparatus as defined in claim 1 wherein said element is a boom, and said boom carries means for delivery fluid to an application area remote from said support member.

9. The apparatus as defined in claim 1 wherein said journalling means is a tube, and said support member is in internal telescopic relationship to said tube.

10. The apparatus as defined in claim 1 wherein said journalling means is defined at least in part by a first tube, said support member is a second tube, and said second tube is in internal telescopic relationship to said first tube.

11. The apparatus as defined in claim 1 wherein said journalling means is defined at least in part by a first tube, said support member is a second tube, said second tube is in internal telescopic relationship to said first tube, means for delivering fluid to said second tube upper end portion, and means for discharging fluid from said second tube lower end portion.

12. The apparatus as defined in claim 1 wherein said journalling means is defined at least in part by a first tube, said support member is a second tube, said second tube is in internal telescopic relationship to said first tube, means for delivering fluid to said second tube upper end portion, and means for discharging fluid from said second tube lower end portion through said element.

13. The apparatus as defined in claim 1 wherein said biasing means includes at least one tension spring.

14. The apparatus as defined in claim 1 wherein said biasing means include at least a pair of tension springs.

15. The apparatus as defined in claim 1 wherein said biasing means include at least a pair of tension springs each having an axis, and a substantially vertical plane includes therein all said axes.

16. The apparatus as defined in claim 1 including means journalling said biasing means for rotation about said vertical axis.

17. The apparatus as defined in claim 1 wherein said biasing means includes at least one tension spring having opposite upper and lower end portions, means for securing the support member lower end portion to said tension spring lower end portion, and means for journalling said tension spring upper end portion for rotation about said vertical axis.

18. The apparatus as defined in claim 1 wherein said biasing means includes at least one tension spring having opposite upper and lower end portions, means for securing the support member lower end portion to said tension spring lower end portion, means for journalling said tension spring upper end portion for rotation about said vertical axis, and said tension spring journalling means includes a collar in rotational surrounding relationship to said first-mentioned journalling means.

19. The apparatus as defined in claim 1 wherein said biasing means includes at least one tension spring having opposite upper and lower end portions, means for securing the support member lower end portion to said tension spring lower end portion, means for journalling said tension spring upper end portion for rotation about said vertical axis, said tension spring journalling means includes a collar in rotational surrounding relationship to said first-mentioned journalling means, a stationary collar, and said first-mentioned collar being rotationally supported by said stationary collar.

20. The apparatus as defined in claim 1 wherein said biasing means are a pair of springs each having opposite upper and lower end portions, means for securing the support member lower end portion to said tension springs lower end portions, and means for journalling said tension springs upper end portions for rotation about said vertical axis.

21. The apparatus as defined in claim 1 wherein said biasing means are a pair of springs each having opposite upper and lower end portions, means for securing the support member lower end portion to said tension springs lower end portions, means for journalling said tension springs upper end portions for rotation about said vertical axis, and said tension springs journalling means include a collar in rotational surrounding relationship to said first-mentioned journalling means.

22. The apparatus as defined in claim 1 wherein said biasing means are a pair of springs each having opposite upper and lower end portions, means for securing the support member lower end portion to said tension springs lower end portions, means for journalling said tension springs upper end portions for rotation about said vertical axis, said tension springs journalling means include a collar in rotational surrounding relationship to said first-mentioned journalling means, a stationary collar, and said first-mentioned collar being rotationally supported by said stationary collar.

23. The apparatus as defined in claim 1 wherein said cam means and said cam follower means are located between said support member upper and lower end portions.

24. The apparatus as defined in claim 1 wherein said cam means and said cam follower means are located between said support member upper and lower end portions, and said biasing means are in vertical spanning relationship to said cam means and said cam follower means.

25. The apparatus as defined in claim 8 wherein said journalling means is a tube, and said support member is in internal telescopic relationship to said tube.

26. The apparatus as defined in claim 8 wherein said journalling means is defined at least in part by a first tube, said support member is a second tube, and said second tube is in internal telescopic relationship to said first tube.

27. The apparatus as defined in claim 8 wherein said journalling means is defined at least in part by a first tube, said support member is a second tube, said second tube is in internal telescopic relationship to said first tube, means for delivering fluid to said second tube upper end portion, and means for discharging fluid from said second tube lower end portion.

28. The apparatus as defined in claim 8 wherein said journalling means is defined at least in part by a first tube, said support member is a second tube, said second tube is in internal telescopic relationship to said first tube, means for delivering fluid to said second tube upper end portion, and means for discharging fluid from said second tube lower end portion through said element.

29. The apparatus as defined in claim 8 wherein said biasing means includes at least one tension spring.

30. The apparatus as defined in claim 8 wherein said biasing means include at least a pair of tension springs.

31. The apparatus as defined in claim 8 wherein said biasing means include at least a pair of tension springs each having an axis, and a substantially vertical plane includes therein all said axes.

32. The apparatus as defined in claim 8 including means journalling said biasing means for rotation about said vertical axis.

33. The apparatus as defined in claim 8 wherein said biasing means includes at least one tension spring having opposite upper and lower end portions, means for securing the support member lower end portion to said tension spring lower end portion, and means for journalling said tension spring upper end portion for rotation about said vertical axis.

34. The apparatus as defined in claim 8 wherein said biasing means includes at least one tension spring having opposite upper and lower end portions, means for securing the support member lower end portion to said tension spring lower end portion, means for journalling said tension spring upper end portion for rotation about said vertical axis, and said tension spring journalling means includes a collar in rotational surrounding relationship to said first-mentioned journalling means.

35. The apparatus as defined in claim 8 wherein said biasing means includes at least one tension spring having opposite upper and lower end portions, means for securing the support member lower end portion to said tension spring lower end portion, means for journalling said tension spring upper end portion for rotation about said vertical axis, said tension spring journalling means includes a collar in rotational surrounding relationship to said first-mentioned journalling means, a stationary collar, and said first-mentioned collar being rotationally supported by said stationary collar.

36. The apparatus as defined in claim 8 wherein said biasing means are a pair of springs each having opposite upper and lower end portions, means for securing the support member lower end portion to said tension springs lower end portions, and means for journalling said tension springs upper end portions for rotation about said vertical axis.

37. The apparatus as defined in claim 8 wherein said biasing means are a pair of springs each having opposite upper and lower end portions, means for securing the support member lower end portion to said tension springs lower end portions, means for journalling said tension springs upper end portions for rotation about said vertical axis, and said tension springs journalling means include a collar in rotational surrounding relationship to said first-mentioned journalling means.

38. The apparatus as defined in claim 8 wherein said biasing means are a pair of springs each having opposite upper and lower end portions, means for securing the support member lower end portion to said tension springs lower end portions, means for journalling said tension springs upper end portions for rotation about said vertical axis, said tension springs journalling means include a collar in rotational surrounding relationship to said first-mentioned journalling means, a stationary collar, and said first-mentioned collar being rotationally supported by said stationary collar.

39. The apparatus as defined in claim 9 wherein said biasing means includes at least one tension spring.

40. The apparatus as defined in claim 9 wherein said biasing means includes at least one tension spring having opposite upper and lower end portions, means for securing the support member lower end portion to said tension spring lower end portion, and means for journalling said tension spring upper end portion for rotation about said vertical axis.

41. The apparatus as defined in claim 9 wherein said biasing means are a pair of springs each having opposite upper and lower end portions, means for securing the support member lower end portion to said tension springs lower end portions, and means for journalling said tension springs upper end portions for rotation about said vertical axis.

42. The apparatus as defined in claim 9 wherein said biasing means are a pair of springs each having opposite upper and lower end portions, means for securing the support member lower end portion to said tension springs lower end portions, means for journalling said tension springs upper end portions for rotation about said vertical axis, said tension springs journalling means include a collar in rotational surrounding relationship to said first-mentioned journalling means, a stationary collar, and said first-mentioned collar being rotationally supported by said stationary collar.

43. The apparatus as defined in claim 9 wherein said cam means and said cam follower means are located between said support member upper and lower end portions.

44. The apparatus as defined in claim 26 wherein said biasing means includes at least one tension spring.

45. The apparatus as defined in claim 26 wherein said biasing means includes at least one tension spring having opposite upper and lower end portions, means for securing the support member lower end portion to said tension spring lower end portion, and means for journalling said tension spring upper end portion for rotation about said vertical axis.

46. The apparatus as defined in claim 26 wherein said biasing means are a pair of springs each having opposite upper and lower end portions, means for securing the support member lower end portion to said tension springs lower end portions, and means for journalling said tension springs upper end portions for rotation about said vertical axis.

47. The apparatus as defined in claim 27 wherein said biasing means includes at least one tension spring.

48. The apparatus as defined in claim 27 wherein said biasing means includes at least one tension spring having opposite upper and lower end portions, means for securing the support member lower end portion to said tension spring lower end portion, and means for journalling said tension spring upper end portion for rotation about said vertical axis.

49. The apparatus as defined in claim 27 wherein said biasing means are a pair of springs each having opposite upper and lower end portions, means for securing the support member lower end portion to said tension springs lower end portions, and means for journalling said tension springs upper end portions for rotation about said vertical axis.

50. Apparatus for moving a vehicle washing boom automatically between first and second positions comprising a substantially vertically oriented support member, means for journalling said support member for rotation in opposite directions about a substantially vertical axis and for sliding movement in opposite directions substantially along said vertical axis, said support member having opposite upper and lower end portions, said lower end portion being reciprocally movable with said support member along said vertical axis between a first uppermost position and a second lowermost position, means for biasing said support member in a first direction to urge said support member lower end portion toward one of said first and second positions, means for controlling the biased movement of said support member toward said one position and toward another position remote therefrom, said controlling means including cooperative cam means and cam follower means carried one by said support member and another in stationary relationship thereto for cooperatively controlling the movement of said support member lower end portion between said one and another positions, a boom carried by said support member lower end portion and movable therewith vertically between said first and second positions and rotationally relatively to said vertical axis upon vertical and rotational movement of said support member, said boom carries means for delivering fluid to an application area remote from said support member, and means at an end of said fluid delivering means for applying fluid to a vehicle.

51. The apparatus as defined in claim 50 wherein said fluid applying means is one of a wand and a brush.

52. The apparatus as defined in claim 50 comprising a substantially vertically oriented second support member, second means for journalling said second support member for rotation in opposite directions about a substantially vertical second axis and for sliding movement in opposite directions substantially along said second vertical axis, said second support member having opposite upper and lower end portions, said second support member lower end portion being reciprocally movable with said second support member along said second vertical axis between a first uppermost position and a second lowermost position, second means for biasing said second support member in a first direction to urge said second support member lower end portion toward one of said second support member first and second positions, second means for controlling the biased movement of said second support member toward said second support member one position and toward another position remote therefrom, said second controlling means including cooperative second cam means and second cam follower means carried one by said second support member and another in stationary relationship thereto for cooperatively controlling the movement of said second support member lower end portion between said one and another positions, a second boom carried by said second support member lower end portion and movable therewith vertically between said first and second positions and rotationally relatively to said second vertical axis upon vertical and rotational movement of said second support member, said second boom carries means for delivering fluid to an application area remote from said second support member, and second means at an end of said fluid delivering means for applying fluid to a vehicle.

53. The apparatus as defined in claim 52 wherein said first-mentioned and second cam means are oriented in substantially 180° offset rational relationship to each other.

54. The apparatus as defined in claim 52 wherein said fluid applying means is one of a wand and a brush.

55. The apparatus as defined in claim 53 wherein said fluid applying means is one of a wand and a brush.

* * * * *